(12) United States Patent
Ishikawa et al.

(10) Patent No.: US 7,740,820 B2
(45) Date of Patent: Jun. 22, 2010

(54) METHOD OF PRODUCING FLUOROAPATITE, FLUOROAPATITE, AND ADSORPTION APPARATUS

(75) Inventors: Tsuyoshi Ishikawa, Tochigi (JP);
Yoshiyuki Ogawara, Tochigi (JP);
Tomohiko Yoshitake, Tokyo (JP);
Yukiko Murakami, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/184,459

(22) Filed: Aug. 1, 2008

(65) Prior Publication Data
US 2009/0148376 A1 Jun. 11, 2009

(30) Foreign Application Priority Data
Aug. 3, 2007 (JP) ............. 2007-203553

(51) Int. Cl.
*C01B 25/10* (2006.01)
*C01B 25/12* (2006.01)
(52) U.S. Cl. .................. 423/301; 423/489
(58) Field of Classification Search ............ 423/301, 423/489, 304
See application file for complete search history.

(56) References Cited

U.S. PATENT DOCUMENTS

| | | | | |
|---|---|---|---|---|
| 4,048,300 | A | * | 9/1977 | Tomlinson et al. ......... 424/52 |
| 5,651,884 | A | * | 7/1997 | Ichitsuka et al. ......... 210/198.2 |
| 2006/0207940 | A1 | | 9/2006 | Kobayashi et al. |
| 2007/0107600 | A1 | | 5/2007 | Yoshitake et al. |

FOREIGN PATENT DOCUMENTS

| | | |
|---|---|---|
| EP | 0 298 503 | 1/1989 |
| JP | 01264915 | * 10/1989 |
| JP | 2004-330113 | 11/2004 |

OTHER PUBLICATIONS

U.S. Appl. No. 11/559,422, filed Nov. 14, 2006, and entitled "Method for Producing Adsorbent, Adsorbent, and Adsorption Apparatus.".
U.S. Appl. No. 12/199,112, filed Aug. 27, 2008, and entitled "Method of Producing Fluoroapatite, Fluoroapatite, and Adsortion Apparatus".
U.S. Appl. No. 12/240,152, filed Sep. 29, 2008, and entitled "Fluoraopatite Dried Particles and Adsorption Appartus.".
English language Abstract of JP 2004-330113, Nov. 25, 2004.

* cited by examiner

*Primary Examiner*—Stuart Hendrickson
*Assistant Examiner*—Richard M Rump
(74) *Attorney, Agent, or Firm*—Greenblum & Bernstein, P.L.C.

(57) ABSTRACT

A method of producing a fluoroapatite is provided. The method comprises preparing a slurry containing a hydroxyapatite which has at least one hydroxyl group, preparing a hydrogen fluoride-containing solution containing a hydrogen fluoride, mixing the hydrogen fluoride-containing solution with the slurry to obtain a mixture to thereby adjust a pH of the mixture in the range of 2.5 to 5, and reacting the hydroxyapatite with the hydrogen fluoride in the mixture in a state that the pH of the mixture is adjusted within the above range to thereby obtain the fluoroapatite by substituting the at least one hydroxyl group of the hydroxyapatite with fluorine atom of the hydrogen fluoride. The method can produce the fluoroapatite having improved acid resistance by reducing an impurity, such as ammonia, derived from a raw material to a low or very low level. Further, a fluoroapatite having high acid resistance is also provided. Furthermore, an adsorption apparatus using such a fluoroapatite is provided.

11 Claims, 5 Drawing Sheets

METHOD OF PRODUCING FLUOROAPATITE, FLUOROAPATITE, AND ADSORPTION APPARATUS

FIELD OF THE INVENTION

The present invention relates to a method of producing fluoroapatite, fluoroapatite, and an adsorption apparatus, and in particular relates to a method of producing fluoroapatite, fluoroapatite that can be obtained by the method, and an adsorption apparatus that uses the fluoroapatite.

BACKGROUND ART

Fluoroapatite has almost the same crystalline structure as hydroxyapatite, and therefore shows almost the same adsorption characteristics (adsorption ability) to a protein as hydroxyapatite.

Further, fluoroapatite is a substance that is stabler than hydroxyapatite, and therefore has high acid resistance. For these reasons, fluoroapatite has advantages that it has high resistance to acid solutions, and therefore is capable of separating proteins in an acid solution.

Such fluoroapatite is generally synthesized by adding (mixing) ammonium hydrogen fluoride as a fluorine source into (with) a slurry containing hydroxyapatite (JP A-2004-330113 is an example of related art.).

However, the fluoroapatite synthesized by such a method contains ammonia adsorbed thereto as an impurity. Apatites such as fluoroapatite have a high ability to adsorb ammonia, and therefore in a case where a slurry containing synthesized fluoroapatite is spray-dried (granulated) to obtain particles, ammonia remains in the particles (fluoroapatite particles) because it is very difficult to remove ammonia from the particles.

Therefore, an amount of ammonia remaining in the thus produced particles is different from lot to lot, which makes it difficult to obtain particles having uniform characteristics.

Further, ammonia remaining in fluoroapatite (particles) inhibits substitution of hydroxyl groups by fluorine atoms, and therefore there are also problems that a rate of the substitution of hydroxyl groups by fluorine atoms can be increased only to a certain extent and therefore it cannot be expected that acid resistance of fluoroapatite is further improved.

SUMMARY OF THE INVENTION

It is objects of the present invention to provide a method of producing fluoroapatite having improved acid resistance by reducing an impurity, such as ammonia, derived from a raw material to a low or very low level, fluoroapatite having high acid resistance, and an adsorption apparatus using such fluoroapatite.

These objects are achieved by the present inventions (1) to (12) described below.

(1) A method of producing a fluoroapatite, the method comprising: preparing a slurry containing a hydroxyapatite which has at least one hydroxyl group; preparing a hydrogen fluoride-containing solution containing a hydrogen fluoride; mixing the hydrogen fluoride-containing solution with the slurry to obtain a mixture to thereby adjust a pH of the mixture in the range of 2.5 to 5; and reacting the hydroxyapatite with the hydrogen fluoride in the mixture in a state that the pH of the mixture is adjusted within the above range to thereby obtain the fluoroapatite by substituting the at least one hydroxyl group of the hydroxyapatite with fluorine atom of the hydrogen fluoride.

According to the method described above, since the hydrogen fluoride is used as a fluorine source, it is possible to obtain the fluoroapatite in which no impurity is contained or an impurity is contained at a very low level. Therefore, it is possible to obtain the fluoroapatite having high crystallinity. Further, the method described above is carried out within a low pH range. Therefore, after the fluoroapatite produced by the method once tends to dissolve, the fluoroapatite is recrystallized. As a result, it is possible to obtain the fluoroapatite having high crystallinity. Furthermore, according to the method described above, since the produced fluoroapatite has a low amount of an impurity such as ammonia, it is possible to increase a rate of substitution of the hydroxyl groups of the hydroxyapatite by the fluorine atoms. From these reasons, it is possible to improve acid resistance of the produced fluoroapatite.

(2) In the method described in the above-mentioned item (1), the mixing the hydrogen fluoride-containing solution with the slurry is carried out by adding the hydrogen fluoride-containing solution into the slurry drop by drop.

According to the method described above, it is possible to react the hydroxyapatite with the hydrogen fluoride by a relative easy method. Further, it is also possible to adjust the pH of the slurry within the above range easily and reliably. For these reasons, decomposition and dissolve of the hydroxyapatite itself can be prevented. Therefore, it is possible to obtain the fluoroapatite primary particles having high purity in a high yield.

(3) In the method described in the above-mentioned item (2), a rate of dropping the hydrogen fluoride-containing solution into the slurry is in the range of 1 to 20 L/hour.

This makes it possible to react the hydroxyapatite with the hydrogen fluoride under mild conditions.

(4) In the method described in the above-mentioned item (1), an amount of the hydrogen fluoride contained in the hydrogen fluoride-containing solution is in the range of 1 to 60 wt %.

According to the method described above, when the hydroxyapatite is reacted with the hydrogen fluoride, it is easy that the pH of the slurry is adjusted in a desired range. Further, since the pH of the hydrogen fluoride-containing solution is not extremely low, the hydrogen fluoride-containing solution can be handled (treated) safely.

(5) In the method described in the above-mentioned item (1), an amount of the hydroxyapatite contained in the slurry is in the range of 1 to 20 wt %.

According to the method described above, when the hydroxyapatite is reacted with the hydrogen fluoride, it is possible to substitute the hydroxyl groups of the hydroxyapatite by the fluorine atoms. Further, the slurry can be sufficiently stirred with a relative low energy. Therefore, it is possible to uniform a rate of substitution of the hydroxyl groups of the hydroxyapatite by the fluorine atoms among the hydroxyapatites.

(6) In the method described in the above-mentioned item (1), in the mixing step the hydrogen fluoride-containing solution is mixed with the slurry so that an amount of the fluorine atom of the hydrogen fluoride becomes in the range of 0.65 to 1.25 times with respect to an amount of the hydroxyl group of the hydroxyapatite.

According to the method described above, it is possible to substitute the hydroxyl groups of the hydroxyapatite by the fluorine atoms more reliably.

(7) In the method described in the above-mentioned item (1), in the reacting step the hydroxyapatite is reacted with the hydrogen fluoride contained in the hydrogen fluoride-containing solution at a temperature in the range of 5 to 50° C.

According to the method of the present invention, even if the pH of the slurry is adjusted to a low, decomposition of the hydroxyapatite can be prevented. Further, it is possible to improve a reaction ratio between the hydroxyapatite and the hydrogen fluoride. Furthermore, recrystallization of the produced fluoroapatite is set off efficiently.

(8) In the method described in the above-mentioned item (1), in the mixing step the hydrogen fluoride-containing solution is added into the slurry for a length of time from 30 minutes to 16 hours.

According to the method described above, it is possible to substitute the hydroxyl groups of the hydroxyapatite by the fluorine atoms sufficiently.

(9) In the method described in the above-mentioned item (1), the hydroxyapatite is primary particles synthesized by a wet synthesis method which uses a calcium source and a phosphoric acid source, wherein at least one of the calcium source and the phosphoric acid source is used in the form of a solution.

According to the method described above, fine hydroxyapatite primary particles are produced and the slurry in which the fine hydroxyapatite primary particles are dispersed uniformly is obtained. Further, the slurry can be prepared easily and efficiently. Furthermore, such a wet synthesis method does not need expensive production equipment (facility), and makes it possible to produce the hydroxyapatite simply and efficiently.

(10) A fluoroapatite produced by using the method described in the above-mentioned item (1).

According to the fluoroapatite described above, an impurity is contained at a low level or very low level, and therefore it is possible to improve acid resistance.

(11) A fluoroapatite which is obtained by reacting a hydroxyapatite having at least one hydroxyl group with a hydrogen fluoride having a fluorine atom, wherein the at least one hydroxyl group is substituted with the fluorine atom, wherein when the fluoroapatite is granulated to obtain dried particles having an average particle size of 40 μm±5 μm, the dried particles are sintered to obtain sintered particles, a column having a filling space is prepared, the sintered particles are filled into the filling space, a buffer solution having a pH of 5 at room temperature is prepared, the buffer solution is supplied into the filling space to obtain an eluate containing Ca, 50 CV of the eluate is discharged out of the filling space of the column at a flow rate of 1.0 mL/min, and 1 mL of the eluate is collected, a concentration of Ca contained in the eluate is 12 ppm or less.

The thus produced fluoroapatite has superior acid resistance.

(12) An adsorption apparatus provided with dried particles obtained by granulating the fluoroapatite described in the above-mentioned item (10) or sintered particles obtained by sintering the dried particles as an adsorbent.

According to the adsorption apparatus described above, the adsorbent having high acid resistance is provided with.

According to the present invention, since the hydrogen fluoride is used as a fluorine source, it is possible to obtain the fluoroapatite in which no impurity is contained or an impurity is contained within a very low level. Therefore, it is possible to obtain the fluoroapatite having high crystallinity. Further, the method described above is carried out at a low pH range (acid region). Therefore, it is possible to improve acid resistance of the produced fluoroapatite.

BEST MODE FOR CARRYING OUT THE INVENTION

Figure 1:
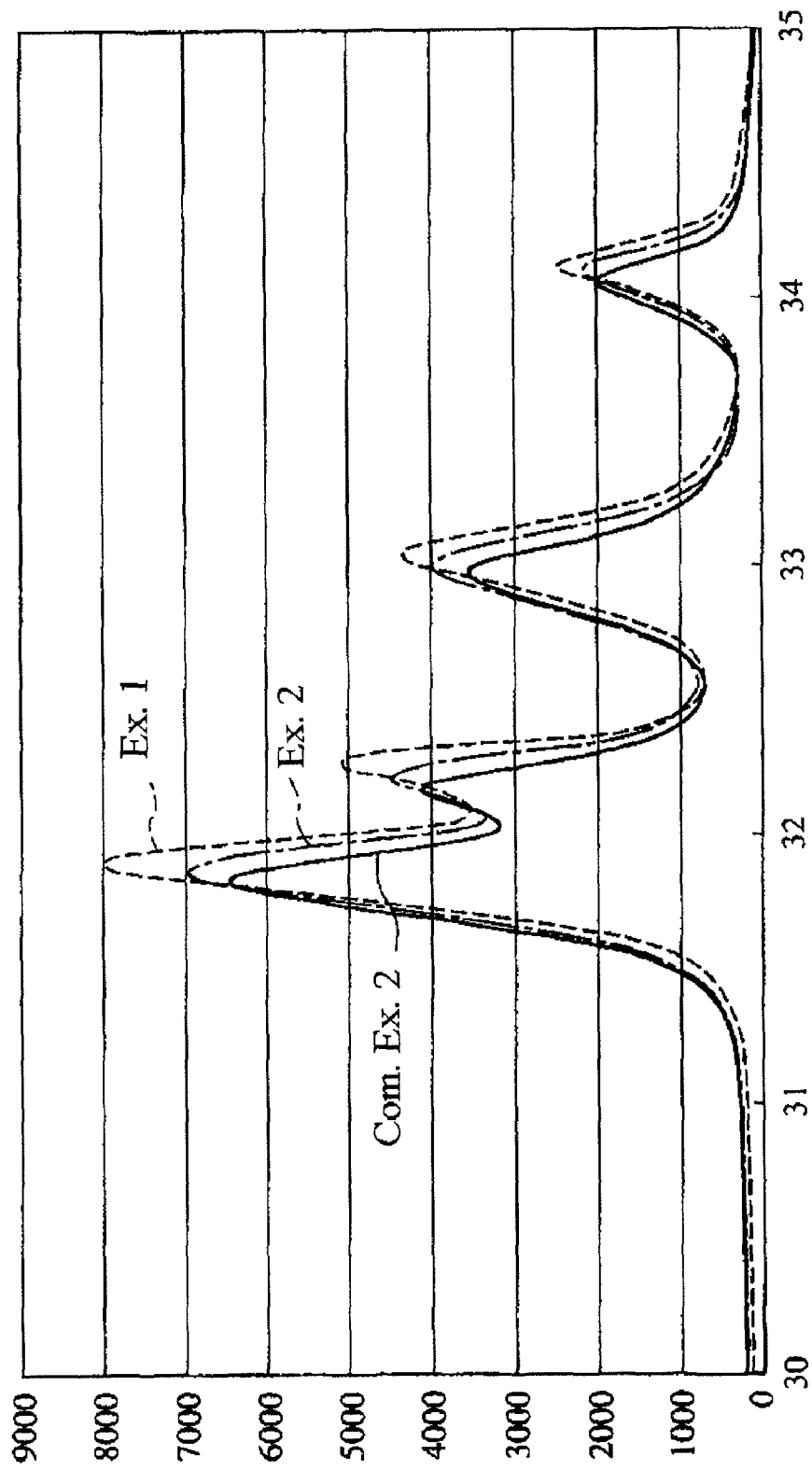
FIG. 1 is powder X-ray diffraction patterns of fluoroapatite sintered particles 1 of Examples 1 and 2 and Comparative Example 2.

Hereinbelow, a method of producing fluoroapatite, fluoroapatite, and an adsorption apparatus according to the present invention will be described in detail with reference to their preferred embodiments.

First, the method of producing fluoroapatite according to the present invention will be described.

The method of producing fluoroapatite according to the present invention includes a slurry preparation step (S1), a hydrogen fluoride-containing solution preparation step (S2), and a fluoroapatite synthesis step (S3). Hereinbelow, these steps will be described in order.

<S1> Slurry Preparation Step

First, a slurry containing hydroxyapatite is prepared.

Hereinbelow, a method of preparing hydroxyapatite primary particles and a slurry in which aggregates of the hydroxyapatite primary particles are dispersed will be described.

The hydroxyapatite primary particles can be obtained by various synthesis methods, but are preferably synthesized by a wet synthesis method in which at least one of a calcium source (calcium compound) and a phosphoric acid source (phosphoric acid compound) is used in the form of a solution. By using such a wet synthesis method, it is possible to form fine hydroxyapatite primary particles and thereby to obtain the slurry in which the aggregates of the hydroxyapatite primary particles are uniformly dispersed.

Further, such a wet synthesis method does not need expensive production equipment, and makes it possible to simply prepare a slurry and efficiently synthesize hydroxyapatite to produce the hydroxyapatite primary particles.

Further, the thus produced hydroxyapatite primary particles are small in size, and have therefore very highly reactive with hydrogen fluoride in the step S3 which will be described later. As a result, the fluoroapatite primary particles having a high rate of substitution of hydroxyl groups of the hydroxyapatite by fluorine atoms are obtained.

Examples of the calcium source to be used in the wet synthesis of the present invention include calcium hydroxide, calcium oxide, calcium nitrate and the like. Examples of the phosphoric acid source to be used in the wet synthesis of the present invention include phosphoric acid, ammonium phosphate and the like. Among them, one mainly containing the calcium hydroxide or the calcium oxide is particularly preferred as the calcium source, and one mainly containing the phosphoric acid is particularly preferred as the phosphoric acid source.

By using such calcium source and phosphoric acid source, it is possible to more efficiently and cheaply produce the hydroxyapatite primary particles. Further, it is also possible to easily obtain the slurry in which the hydroxyapatite primary particles or their aggregates are dispersed.

More specifically, such hydroxyapatite primary particles and slurry can be obtained by dropping a phosphoric acid ($H_3PO_4$) solution into a suspension of calcium hydroxide ($Ca(OH)_2$) or calcium oxide (CaO) contained in a container and mixing them by stirring.

An average particle size of the aggregates of such hydroxyapatite primary particles is preferably in the range of about 1 to 20 μm, and more preferably in the range of about 5 to 12 μm. This makes it possible to effectively prevent handling of the aggregates from becoming difficult due to too small size thereof. The average particle size of these aggregates is an appropriately size, and therefore can be easily brought into contact with hydrogen fluoride so that the hydroxyl groups of the hydroxyapatite are more efficiently substituted by the fluorine atoms.

An amount of the hydroxyapatite primary particles contained in the slurry is preferably in the range of about 1 to 20 wt %, and more preferably in the range of about 5 to 12 wt %. This makes it possible to more efficiently substitute the hydroxyl groups of the hydroxyapatite by the fluorine atoms in the step S3 which will be described later. In addition, it is also possible to sufficiently stir the slurry with relatively low energy in the step S3 which will be described later and thereby to make an uniform rate of substitution of the hydroxyl groups of the hydroxyapatite by the fluorine atoms among the hydroxyapatite primary particles.

<S2> Hydrogen Fluoride-Containing Solution Preparation Step

A solution containing hydrogen fluoride is prepared separately from the slurry containing the hydroxyapatite.

A solvent for dissolving the hydrogen fluoride is not particularly limited, and any solvent can be used as long as it does not inhibit a reaction to be carried out in the step S3 which will be described later.

Examples of such a solvent include water, an alcohol such as methanol and ethanol, and the like. These solvents may be used in combination of two or more of them. However, among them, water is particularly preferred. By using water as a solvent, it is possible to more reliably prevent the inhibition of the reaction to be carried out in the step S3 which will be described later.

An amount of the hydrogen fluoride contained in the hydrogen fluoride-containing solution is preferably in the range of about 1 to 60 wt %, and more preferably in the range of about 2.5 to 10 wt %. By setting the amount of the hydrogen fluoride contained in the hydrogen fluoride-containing solution to a value within the above range, it is possible to easily adjust the pH of the slurry in which the hydrogen fluoride-containing solution is added to a value within a desired range in the step S3 which will be described later. In addition, it is also possible to prevent the hydrogen fluoride-containing solution from reaching an extremely low pH and thereby to handle the hydrogen fluoride-containing solution safely.

<S3> Fluoroapatite Synthesis Step

Then, the slurry prepared in the step S1 and the hydrogen fluoride-containing solution prepared in the step S2 are mixed together to react the hydroxyapatite primary particles with the hydrogen fluoride in the slurry containing the hydrogen fluoride-containing solution to obtain fluoroapatite primary particles.

More specifically, as shown in the following formula (I), by bringing the hydroxyapatite primary particles into contact with the hydrogen fluoride, it is possible to substitute at least part of the hydroxyl groups of the hydroxyapatite by the fluorine atom of the hydrogen fluoride to convert the hydroxyapatite into fluoroapatite and thereby to obtain the fluoroapatite primary particles.

$$Ca_{10}(PO_4)_6(OH)_2 \rightarrow Ca_{10}(PO_4)_6(OH)_{2-2x}F_{2x} \qquad (I)$$

(wherein $0 < x \leqq 1$)

As described above, by reacting the hydroxyapatite primary particles with the hydrogen fluoride in the slurry containing the hydroxyapatite primary particles, it is possible to easily produce the fluoroapatite primary particles.

Further, since the hydroxyl groups of the hydroxyapatite are substituted by the fluorine atoms during the stage of the hydroxyapatite primary particles, the obtained fluoroapatite primary particles have a particularly high rate of substitution of the hydroxyl groups by the fluorine atoms.

Further, since hydrogen fluoride (HF) is used as a fluorine source, no by-product is formed or an amount of a formed by-product is extremely small as compared to a case where ammonium hydrogen fluoride ($NH_4F$), lithium fluoride (LiF), sodium fluoride (NaF), potassium fluoride (KF), magnesium fluoride ($MgF_2$), calcium fluoride ($CaF_2$), or the like is used as the fluorine source. Therefore, an amount of an impurity (by-product) contained in the fluoroapatite primary particles can be made small so that acid resistance of the fluoroapatite primary particles is improved. It is to be noted that the term "impurity" used herein means ammonia, lithium or the like derived from a raw material of the fluoroapatite.

More specifically, the impurity content of the fluoroapatite is preferably as small as possible. For example, it is preferably 300 ppm or less, and more preferably 100 ppm or less. This makes it possible to further improve acid resistance of the fluoroapatite primary particles due to their low impurity content.

According to the present invention, by adjusting the reaction conditions (e.g., pH, temperature, time) of the reaction between the hydroxyapatite (primary particles) and the hydrogen fluoride, it is possible to allow the impurity content contained in the fluoroapatite primary particles to fall within the above range.

Particularly, according to the present invention, the pH of the slurry is adjusted to fall within the range of 2.5 to 5 by mixing the hydrogen fluoride-containing solution with the slurry, and in this state, the hydroxyapatite (primary particles) reacts with the hydrogen fluoride. In this regard, it is to be noted that in this specification, the pH of the slurry means a pH value at the time when an entire amount of the hydrogen fluoride-containing solution is mixed with the slurry.

If the pH of the slurry is adjusted to less than 2.5, there is a tendency that the hydroxyapatite itself dissolves, and therefore it becomes difficult to convert the hydroxyapatite into the fluoroapatite to obtain fluoroapatite primary particles. Further, in this case, there is also a problem that constituent materials of a device for use in mixing the hydroxyapatite primary particles with the hydrogen fluoride-containing solution are eluted into the slurry so that low-purity fluoroapatite primary particles are obtained. Furthermore, it is technically very difficult to adjust the pH of the slurry to a low value less than 2.5 using the hydrogen fluoride-containing solution.

On the other hand, in order to adjust the pH of the slurry to more than 5 using the hydrogen fluoride-containing solution, a large amount of water has to be added to the slurry. In this case, a total amount of the slurry becomes extremely large, and as a result, the yield of the fluoroapatite primary particles based on the total amount of the slurry is lowered. This is industrially disadvantageous.

In contrast to the above two cases, in a case where the pH of the slurry is adjusted to fall within the range of 2.5 to 5, the fluoroapatite (primary particles) produced by the reaction once tends to dissolve and is then recrystallized. Therefore, the fluoroapatite primary particles having high crystallinity can be obtained.

It is to be noted that as described above, the pH of the slurry shall be adjusted to fall within the range of 2.5 to 5, but is preferably adjusted to fall within the range of about 2.5 to 4.5, and more preferably in the range of about 2.7 to 4. By adjusting the pH of the slurry to a value within the above range, it is possible to more easily obtain the fluoroapatite primary particles having high crystallinity in good yield.

The slurry and the hydrogen fluoride-containing solution may be mixed together at one time, but they are preferably mixed by adding (dropping) the hydrogen fluoride-containing solution into the slurry drop by drop. By dropping the hydrogen fluoride-containing solution into the slurry, it is possible to relatively easily react the hydroxyapatite primary particles with the hydrogen fluoride and to more easily and reliably adjust the pH of the slurry to a value within the above range. Therefore, it is possible to prevent decomposition or dissolution of the hydroxyapatite itself and thereby to obtain high-purity fluoroapatite primary particles in a good yield.

A rate of dropping the hydrogen fluoride-containing solution into the slurry is preferably in the range of about 1 to 20 L/hr, and more preferably in the range of about 3 to 10 L/hr. By mixing (adding) the hydrogen fluoride-containing solution with (to) the slurry at such a dropping rate, it is possible to react the hydroxyapatite primary particles with the hydrogen fluoride under milder conditions.

Further, the reaction between the hydroxyapatite primary particles and the hydrogen fluoride is preferably carried out while the slurry is stirred. By stirring the slurry, it is possible to bring the hydroxyapatite primary particles into uniform contact with the hydrogen fluoride and thereby to allow the reaction between the hydroxyapatite primary particles and the hydrogen fluoride to efficiently proceed. In addition, it is also possible to obtain the fluoroapatite primary particles more uniform in the rate of substitution of the hydroxyl groups of the hydroxyapatite by the fluorine atoms. By using such fluoroapatite primary particles, it is possible to produce, for example, an adsorbent (dried particles or sintered particles) having less characteristic variations and high reliability.

In this case, power for stirring the slurry is preferably in the range of about 1 to 10 kW, and more preferably in the range of about 1 to 5 kW per 1 liter of the slurry. By setting the stirring power to a value within the above range, it is possible to further improve the efficiency of the reaction between the hydroxyapatite primary particles and the hydrogen fluoride.

An amount of the hydrogen fluoride to be mixed is determined so that an amount of the fluorine atoms becomes preferably in the range of about 0.65 to 1.25 times, and more preferably in the range of about 0.75 to 1.15 times with respect to an amount of the hydroxyl groups of the hydroxyapatite. This makes it possible to more efficiently substitute the hydroxyl groups of the hydroxyapatite by the fluorine atoms.

A temperature of the reaction between the hydroxyapatite primary particles and the hydrogen fluoride is not particularly limited, but is preferably in the range of about 5 to 50° C., and more preferably in the range of about 20 to 40° C. By setting the temperature to a value within the above range, it is possible to prevent decomposition or dissolution of the hydroxyapatite (primary particles) even when the pH of the slurry is adjusted to a low value. Further, it is also possible to improve a reaction rate between the hydroxyapatite primary particles and the hydrogen fluoride. Furthermore, it is also possible to efficiently promote recrystallization of the produced fluoroapatite and thereby to obtain the fluoroapatite primary particles.

In this case, the hydrogen fluoride is preferably dropped (added) into (to) the slurry containing the hydroxyapatite primary particles for a length of time from about 30 minutes to 16 hours, and more preferably for a length of time from about 1 to 8 hours. By dropping the hydrogen fluoride into the slurry containing the hydroxyapatite primary particles in such a period of time to react the hydroxyapatite primary particles with the hydrogen fluoride, it is possible to sufficiently substitute the hydroxyl groups of the hydroxyapatite by the fluorine atoms. It is to be noted that even if the time for dropping the hydrogen fluoride into the slurry is prolonged to exceed the above upper limit value, it cannot be expected that the reaction between the hydroxyapatite primary particles and the hydrogen fluoride will further proceed.

In such a manner as described above, at least a part of the hydroxyl groups of the hydroxyapatite are substituted by the fluorine atoms so that the fluoroapatite is obtained.

The fluoroapatite is not limited to pure fluoroapatite as shown by the formula (I) described above wherein degree of halogenation represented as x is 1 (i.e., fluoroapatite obtained by substituting all the hydroxyl groups of the hydroxyapatite by the fluorine atoms). The fluoroapatite also includes one obtained by substituting only part of the hydroxyl groups of the hydroxyapatite by the fluorine atoms.

Further, according to the present invention, it is possible to substitute the hydroxyl groups of the hydroxyapatite present not only in the surface but also in the inside portion of the hydroxyapatite primary particles by the fluorine atoms. More specifically, it is possible to substitute 75% or more of the hydroxyl groups of the hydroxyapatite by the fluorine atoms. Further, by appropriately regulating the reaction conditions (e.g., pH, temperature, time, amount of hydrogen fluoride to be mixed) of the reaction between the hydroxyapatite primary particles and the hydrogen fluoride, it is also possible to substitute 95% or more of the hydroxyl groups of the hydroxyapatite by the fluorine atoms. It is to be noted that the fluoroapatite obtained by substituting 50% or more of the hydroxyl groups of the hydroxyapatite by the fluorine atoms is preferred because it has particularly excellent acid resistance.

Further, such fluoroapatite primary particles contain a very little amount of an impurity, and are therefore stable and excellent in acid resistance.

The level of the acid resistance of the fluoroapatite primary particles can be determined by, for example, the following method.

More specifically, the level of the acid resistance of the fluoroapatite primary particles can be determined by bringing the fluoroapatite primary particles or sintered particles, which are obtained by sintering dried particles obtained by granulating the fluoroapatite primary particles, into contact with an acid solution and then measuring an amount of Ca eluted from the fluoroapatite primary particles or the sintered particles.

For example, sintered particles, which are obtained by sintering particles (dried particles) obtained by granulating the fluoroapatite so that an average particle size becomes 40

µm±5 µm, are filled into a filling space of a column, and then 50 CV (1 CV=1.256 mL) of a buffer solution having a pH of 5 (at room temperature) is allowed to pass through the filling space of the column at a flow rate of 1.0 mL/min to obtain an eluate. Then, 1 mL of the eluate initially discharged from the filling space of the column is collected, and Ca concentration of the eluate is measured to determine the level of the acid resistance of the sintered particles.

The Ca concentration measured under the conditions described above is preferably as low as possible, i.e., as close to "0 ppm" as possible. More specifically, the Ca concentration is preferably 12 ppm or less, more preferably 10 ppm or less, and even more preferably 5 ppm or less. When the concentration of Ca eluted from the sintered particles (fluoroapatite particles) is low, it can be judged that the fluoroapatite particles have extremely high acid resistance.

Examples of the buffer solution to be used for determining the level of acid resistance include, but are not limited thereto, a sodium phosphate buffer and phosphate, acetate, citrate, carbonate, succinate, and glycine buffers.

Further, a salt concentration of the buffer solution is preferably in the range of about 100 to 700 mM, and more preferably in the range of about 300 to 500 mM.

The dried particles of the fluoroapatite can be obtained by drying or granulating the slurry containing such fluoroapatite primary particles, and the dried particles can be further sintered to obtain sintered particles. In a case where the fluoroapatite is used as an adsorbent, sintered particles are preferred from the viewpoint of mechanical strength. However, in a case where a load to be applied to the adsorbent is relatively light, the dried particles may also be used. By using such an adsorbent as a stationary phase of an adsorption apparatus used in chromatography, it is possible to expand the range of choices of conditions for separation or adsorption of an object to be tested (e.g., protein) and thereby to apply such an adsorption apparatus used in chromatography to a wider range of areas (fields).

It is to be noted that a method of drying or granulating the slurry containing the fluoroapatite primary particles is not particularly limited, and an example of such a method includes spray drying using a spray drier and the like.

A sintering temperature of the dried particles is preferably in the range of about 200 to 800° C., and more preferably in the range of about 400 to 700° C. By setting the sintering temperature to a value within the above range, it is possible to obtain an adsorbent having excellent mechanical strength while gaps (pores) are allowed to remain in the fluoroapatite primary particles or between the fluoroapatite primary particles adjacent to each other (i.e., in aggregates).

The application of the fluoroapatite is not limited to such an adsorbent. For example, the dried particles of fluoroapatite may be molded and then sintered to obtain a sintered body. The thus obtained sintered body can be used as artificial bone or dental root.

Although the method of producing the fluoroapatite, the fluoroapatite, and the adsorption apparatus according to the present invention have been described above with reference to their preferred embodiments, the present invention is not limited to these embodiments.

For example, the above embodiments have been described with reference to a representative case where the fluoroapatite is produced using the hydrogen fluoride-containing solution and the hydroxyapatite primary particles, but hydroxyapatite dried particles obtained by granulating the hydroxyapatite primary particles or the sintered particles of the hydroxyapatite may be used instead of the hydroxyapatite primary particles. Also in this case, by substituting the hydroxyl groups of the hydroxyapatite primary particles by the fluorine atoms of hydrogen fluorides as in the case of the above embodiments, it is possible to increase a rate of substitution of the hydroxyl groups by the fluorine atoms and thereby to obtain the fluoroapatite having excellent acid resistance.

EXAMPLES

Hereinbelow, the present invention will be described with reference to actual examples.

1. Production of Fluoroapatite

Example 1

First, calcium hydroxide was suspended in pure water to obtain a calcium hydroxide suspension, and then an aqueous phosphoric acid solution was dropped into the calcium hydroxide suspension while the calcium hydroxide suspension was sufficiently stirred. As a result, 500 L of a slurry containing 10 wt % of hydroxyapatite primary particles was obtained.

It is to be noted that the thus obtained hydroxyapatite primary particles were found to be hydroxyapatite by powder X-ray diffractometry.

On the other hand, hydrogen fluoride was dissolved in pure water so that an amount thereof is 5 wt % to prepare a hydrogen fluoride-containing solution.

Then, 41.84 L of the hydrogen fluoride-containing solution was dropped into the slurry at a rate of 5 L/hr while the slurry was stirred at a stirring power of 1 kW.

It is to be noted that the slurry had a pH of 3.00 at the time when the dropping of the hydrogen fluoride-containing solution was completed. An amount of the hydrogen fluoride to be mixed with the slurry was determined so that an amount of fluorine atoms became about 1.05 times with respect to an amount of the hydroxyl groups of the hydroxyapatite.

Further, the slurry was stirred at a stirring power of 1 kW at 30° C. for 24 hours to react the hydroxyapatite primary particles with the hydrogen fluoride. As a result, a slurry containing fluoroapatite primary particles was obtained.

It is to be noted that a reaction product contained in the slurry, namely the fluoroapatite primary particles were found to be fluoroapatite by powder X-ray diffractometry. Further, as a result of powder x-ray diffraction of the fluoroapatite primary particles, a rate of substitution of the hydroxyl groups by the fluorine atoms was found to be about 100%.

Further, as a result of powder X-ray diffraction of dried particles of the fluoroapatite, any products other than fluoroapatite were not detected.

Then, the slurry containing the fluoroapatite primary particles was spray-dried at 150° C. using a spray drier (manufactured by OHKAWARA KAKOHKI Co., Ltd. under the trade name of "OC-20") to produce particulate dried particles (hereinafter, referred to as "fluoroapatite dried particles".).

Then, part of the fluoroapatite dried particles were classified to obtain particles having a median particle size of about 40 µm, and then these particles were sintered in an electric furnace at 400° C. for 4 hours to obtain fluoroapatite sintered particles 1. Also, part of the fluoroapatite dried particles were classified to obtain particle having a median particle size of about 40 µm, and then these particles were sintered in an electric furnace at 700° C. for 4 hours to obtain fluoroapatite sintered particles 2.

It is to be noted that each of the two kinds of fluoroapatite sintered particles 1 and 2 (adsorbents) had an average particle size of about 40 µm.

Example 2

Fluoroapatite primary particles, fluoroapatite dried particles, and fluoroapatite sintered particles 1 and 2 were produced in the same manner as in the Example 1 except that the pH of the slurry at the time of completion of the dropping of the hydrogen fluoride-containing solution was adjusted to 3.36 by adding pure water to the hydrogen fluoride-containing solution.

It is to be noted that the fluoroapatite primary particles had a rate of substitution of hydroxyl groups by fluorine atoms of about 75%. Further, as a result of powder X-ray diffraction of the fluoroapatite dried particles, any products other than the fluoroapatite were not detected.

It is also to be noted that the fluoroapatite dried particles had an average particle size of about 40 µm, and each of the two kinds of the fluoroapatite sintered particles 1 and 2 (adsorbents) also had an average particle size of about 40 µm.

Example 3

Fluoroapatite primary particles, fluoroapatite dried particles, and fluoroapatite sintered particles 1 and 2 were produced in the same manner as in the Example 1 except that the pH of the slurry at the time of completion of the dropping of the hydrogen fluoride-containing solution was adjusted to 3.96 by adding pure water to the hydrogen fluoride-containing solution.

It is to be noted that the fluoroapatite primary particles had a rate of substitution of hydroxyl groups by fluorine atoms of about 50%. Further, as a result of powder x-ray diffraction of the fluoroapatite dried particles, any products other than the fluoroapatite and the hydroxyapatite were not detected.

It is also to be noted that the fluoroapatite dried particles had an average particle size of about 40 µm, and each of the two kinds of the fluoroapatite sintered particles 1 and 2 (adsorbents) also had an average particle size of about 40 µm.

Comparative Example 1

Fluoroapatite primary particles, fluoroapatite dried particles, and fluoroapatite sintered particles 1 and 2 were produced in the same manner as in the Example 1 except that the pH of the slurry at the time of completion of the dropping of the hydrogen fluoride-containing solution was adjusted to 6.03 by adding pure water to the hydrogen fluoride-containing solution.

It is to be noted that the fluoroapatite primary particles had a rate of substitution of hydroxyl groups by fluorine atoms of about 25% which was lower than those in the Examples 1 to 3.

Further, as a result of powder X-ray diffraction of the fluoroapatite dried particles, any products other than the fluoroapatite and the hydroxyapatite were not detected.

The fluoroapatite dried particles had an average particle size of about 40 µm, and each of the two kinds of fluoroapatite sintered particles 1 and 2 (adsorbents) also had an average particle size of about 40 µm.

In the case of the Comparative Example 1, an amount of the fluoroapatite contained in the slurry containing the fluoroapatite primary particles before spray drying was 0.14 wt % which was about $1.6 \times 10^{-2}$ times with respect to the amount of the fluoroapatite contained in the slurry used in the Example 1 (9.0 wt %). Therefore, in order to obtain the same amount of the fluoroapatite dried particles as the Example 1, it is necessary to prepare the slurry in an amount which is about 64 times with respect to the amount of the slurry used in the Example 1. Therefore, it takes much time and effort to spray-dry such a large amount of the slurry. For this reason, it is considered that it is difficult to apply the method described in the Comparative Example 1 to industrial production.

Comparative Example 2

First, a slurry containing 10 wt % of hydroxyapatite primary particles was prepared in the same manner as in the Example 1.

Then, 4.5 L of a 6 M aqueous ammonium hydrogen fluoride solution was dropped into 20 L of the slurry at a rate of 1.2 L/hr while the slurry was stirred at a stirring power of 1 kW.

It is to be noted that a pH of the slurry at the time of completion of the dropping of the aqueous ammonium hydrogen fluoride solution was 7.00.

Further, the slurry was stirred at a stirring power of 1 kW at 30° C. for 24 hours to react the hydroxyapatite primary particles and the ammonium hydrogen fluoride. As a result, a slurry containing fluoroapatite primary particles was obtained.

It is to be noted that a reaction product contained in the slurry, namely the fluoroapatite primary particles were found to be fluoroapatite by powder X-ray diffractometry. Further, as a result of powder X-ray diffraction of the fluoroapatite primary particles, a rate of substitution of the hydroxyl groups by the fluorine atoms was about 70%.

Then, the slurry containing the fluoroapatite primary particles was spray-dried at 150° C. using the same spray drier as used in the Example 1 to produce particulate dried particles (hereinafter, referred to as "fluoroapatite dried particles".).

Then, part of the fluoroapatite dried particles were classified to obtain particles having a median particle size of about 40 µm, and then these particles were sintered in an electric furnace at 400° C. for 4 hours to obtain fluoroapatite sintered particles 1. Also, part of the fluoroapatite dried particles were classified to obtain particles having a median particle size of about 40 µm, and then these particles were sintered in an electric furnace at 700° C. for 4 hours to obtain fluoroapatite sintered particles 2.

It is to be noted that each of the two kinds of fluoroapatite sintered particles 1 and 2 (adsorbents) had an average particle size of about 40 µm.

Further, each of the two kinds of fluoroapatite particles (i.e., the fluoroapatite dried particles obtained by spray drying after synthesis of the fluoroapatite and the fluoroapatite sintered particles 1 obtained by sintered the fluoroapatite dried particles at 400° C.) was washed with pure water three times, and was then left standing for one day to obtain a supernatant. Then, Nessler's reagent was added to the thus obtained two kinds of supernatants, and as a result, both of them turned brown. From the results, it can be considered that part of ammonia was liberated from the fluoroapatite primary particles. Further, the three kinds of fluoroapatite dried particles and the three kinds of fluoroapatite sintered particles 1, which are obtained in the Examples 1 to 3, were also treated in the same manner as described above to obtain supernatants, and then Nessler's reagent was added to the supernatants, but none of them turned brown.

REFERENCE EXAMPLE

A slurry containing hydroxyapatite primary particles was obtained in the same manner as in the Example 1.

Then, the slurry containing the hydroxyapatite primary particles was spray-dried at 150° C. using the same spray drier as used in the Example 1 to produce particulate dried particles (hereinafter, referred to as "hydroxyapatite dried particles".).

Then, part of the hydroxyapatite dried particles were classified to obtain particles having a median particle size of about 40 μm, and then these particles were sintered in an electric furnace at 400° C. for 4 hours to obtain hydroxyapatite sintered particles 1. Also, part of the hydroxyapatite dried particles were classified to obtain particles having a median particle size of about 40 μm, and then these particles were sintered in an electric furnace at 700° C. for 4 hours to obtain hydroxypatite sintered particles 2.

It is to be noted that each of the two kinds of hydroxyapatite sintered particles 1 and 2 (adsorbents) had an average particle size of about 40 μm.

2. Evaluation 2-1. Evaluation of Crystallinity by Powder X-Ray Diffraction

Each of the fluoroapatite sintered particles 1 obtained in the Examples 1 to 3 and the Comparative Examples 1 and 2 were subjected to powder X-ray diffraction to obtain a pattern having peaks containing a main peak.

As a result, from the number of counts in the main peak, etc., it has been found that the fluoroapatite sintered particles 1 of the Examples 1 to 3 have high crystallinity, whereas the fluoroapatite sintered particles 1 of the Comparative Examples 1 and 2 have low crystallinity.

The powder X-ray diffraction patterns of the fluoroapatite sintered particles 1 of the Examples 1 and 2 and the Comparative Example 2 are shown in FIG. 1 as representatives.

2-2. Evaluation of Crystallinity by Ca Elution

Each of the four kinds of fluoroapatite sintered particles (i.e., the fluoroapatite sintered particles 1 of the Example 1 and the Comparative Example 2 sintered at 400° C. and the fluoroapatite sintered particles 2 of the Example 1 and the Comparative Example 2 sintered at 700° C.) was filled into the filling space of a column ("LCI-1116WF −4.0×100-2 PL-PEEK", Sugiyama Shoji Co., Ltd., inner diameter: 4.0 mm, length: 100 mm) so that the filling space of the column was almost fully filled with each of the fluoroapatite sintered particles. In this way, columns filled with the fluoroapatite sintered particles 1 of the Example 1, the fluoroapatite sintered particles 2 of the Example 1, the fluoroapatite sintered particles 1 of the Comparative Example 2, and the fluoroapatite sintered particles 2 of the Comparative Example 2 respectively were prepared.

It is to be noted that the capacity of the filling space of each column was 1.256 mL.

Then, 50 CV (1 CV=1.256 mL) of a 400 mM sodium phosphate buffer (at pH 5 and 25° C.) was allowed to pass through each of the filling spaces of the columns at a flow rate of 1.0 mL/min, and then 1 mL of an eluate initially discharged from the filling space of the column was collected.

Ca concentrations of the eluates discharged from the columns filled with the fluoroapatite sintered particles 1 of the Example 1, the fluoroapatite sintered particles 2 of the Example 1, the fluoroapatite sintered particles 1 of the Comparative Example 2, and the fluoroapatite sintered particles 2 of the Comparative Example 2 respectively are shown in Table 1.

TABLE 1

| | Fluorine source | pH of slurry | Rate of substitution of hydroxyl groups of hydroxyapatite primary particles by fluorine atoms | Sintering temperature of dried particles | Ca concentration [ppm] |
|---|---|---|---|---|---|
| Ex. 1 | Hydrogen fluoride | 3.00 | 100% | 400° C. | 6.15 |
| | | | | 700° C. | 6.09 |
| Ex. 2 | Hydrogen fluoride | 3.36 | 75% | 400° C. | 6.37 |
| Com. Ex. 2 | Ammonium hydrogen fluoride | 7.00 | 70% | 400° C. | 20.70 |
| | | | | 700° C. | 13.23 |
| Ref. Ex. | — | 7.00 | 0% | 400° C. | 70.60 |

As can be seen from the Ca concentrations shown in Table 1, the liberation of Ca from the fluoroapatite sintered particles 1 and 2 of the Example 1 into the eluate was properly suppressed as compared to the case of the fluoroapatite sintered particles 1 and 2 of the Comparative Example 2.

From the results, it can be supposed that the fluoroapatite sintered particles 1 and 2 of the Example 1 have higher acid resistance than the fluoroapatite sintered particles 1 and 2 of the Comparative Example 2. Further, a column filled with the fluoroapatite sintered particles 1 of the Example 2 sintered at 400° C. and a column filled with the hydroxyapatite sintered particles 1 of the Reference Example sintered at 400° C. were prepared, and Ca concentrations of eluates were measured in the same manner as described above. As a result, as shown in Table 1, the Ca concentration of the eluate discharged from the column filled with the fluoroapatite sintered particles 1 of the Example 2 was 6.37 ppm, and the Ca concentration of the eluate discharged from the column filled with the hydroxyapatite sintered particles 1 of the Reference Example was 70.60 ppm.

2-3. Evaluation of Change in Protein Adsorption Ability

Each of the six kinds of sintered particles (i.e., the fluoroapatite sintered particles 1 of the Examples 1 to 3 and the Comparative Examples 1 and 2 and the hydroxyapatite sintered particles 1 of the Reference Example) was filled into a filling space of a column ("LCI-1116WF −4.0×100-2 PL-PEEK", Sugiyama Shoji Co., Ltd., inner diameter: 4.0 mm, length: 100 mm) so that the filling space of the column was almost fully filled with the sintered particles. In this way, columns filled with the six kinds of sintered particles 1 of the Examples 1 to 3, the Comparative Examples 1 and 2, and the Reference Example respectively were prepared.

It is to be noted that the capacity of the filling space of each column was 1.256 mL.

Then, 125.6 mL of a 400 mM sodium phosphate buffer (at pH 5 and 25° C.) was allowed to pass through each of the columns at a flow rate of 1.0 mL/min.

Then, a sample was prepared by dissolving myoglobin, ovalbumin, α-chymotrypsinogen A, and cytochrome C in a 1 mM sodium phosphate buffer (pH 6.8) so that the concentrations thereof became 5 mg/mL, 10 mg/mL, 5 mg/mL, and 5 mg/mL, respectively, and 50 µl of the sample was supplied into each of the filling spaces of the columns.

Then, a phosphate buffer (pH 6.8) was supplied into each of the filling spaces of the columns. Then, the supplied phosphate buffer was flowed at a flow rate of 1 mL/min for 22 minutes, and then the each absorbance of myoglobin, ovalbumin, α-chymotrypsinogen A, and cytochrome C contained in the phosphate buffer discharged from the column was measured at a wavelength of 280 nm.

It is to be noted that the phosphate buffer (pH 6.8) was supplied into each of the columns in such a manner that a mixing ratio of a 400 mM phosphate buffer to a 10 mM phosphate buffer was increased from 0 to 75% during a period of time from the 1st minute to the 16th minute and was then kept at 100% for 5 minutes after the 16th minute.

It is to be noted that also before the sodium phosphate buffer having a pH of 5 was allowed to pass through the columns as described above, separation of myoglobin, ovalbumin, α-chymotrypsinogen A, and cytochrome C had been carried out in each of the columns under the same conditions as described above.

A change in protein (i.e. myoglobin, ovalbumin, α-chymotrypsinogen A, and cytochrome C) separation characteristics of the sintered particles before and after the supplying of the sodium phosphate buffer having the pH of 5 into the filling space of the each of the columns was examined, respectively.

As a result, no change in the protein separation characteristics was found in all the cases where the columns filled with the three kinds of fluoroapatite sintered particles 1 of the Examples 1 to 3 respectively were used.

On the other hand, in all the cases where the columns filled with the two kinds of fluoroapatite sintered particles 1 of the Comparative Examples 1 and 2 respectively and the column filled with the hydroxyapatite sintered particles 1 of the Reference Example were used, each myoglobin tended to be eluted earlier when protein separation was carried out after the sodium phosphate buffer having the pH of 5 was supplied into the filling space of each of the columns.

The reason for this can be considered as follows. Calcium was eluted from the fluoroapatite sintered particles 1 and the hydroxyapatite sintered particles 1, and therefore it became difficult to adsorb myoglobin, which is a neutral protein absorbable to a Ca site, to the fluoroapatite sintered particles 1 and the hydroxyapatite sintered particles 1.

Figure 2:
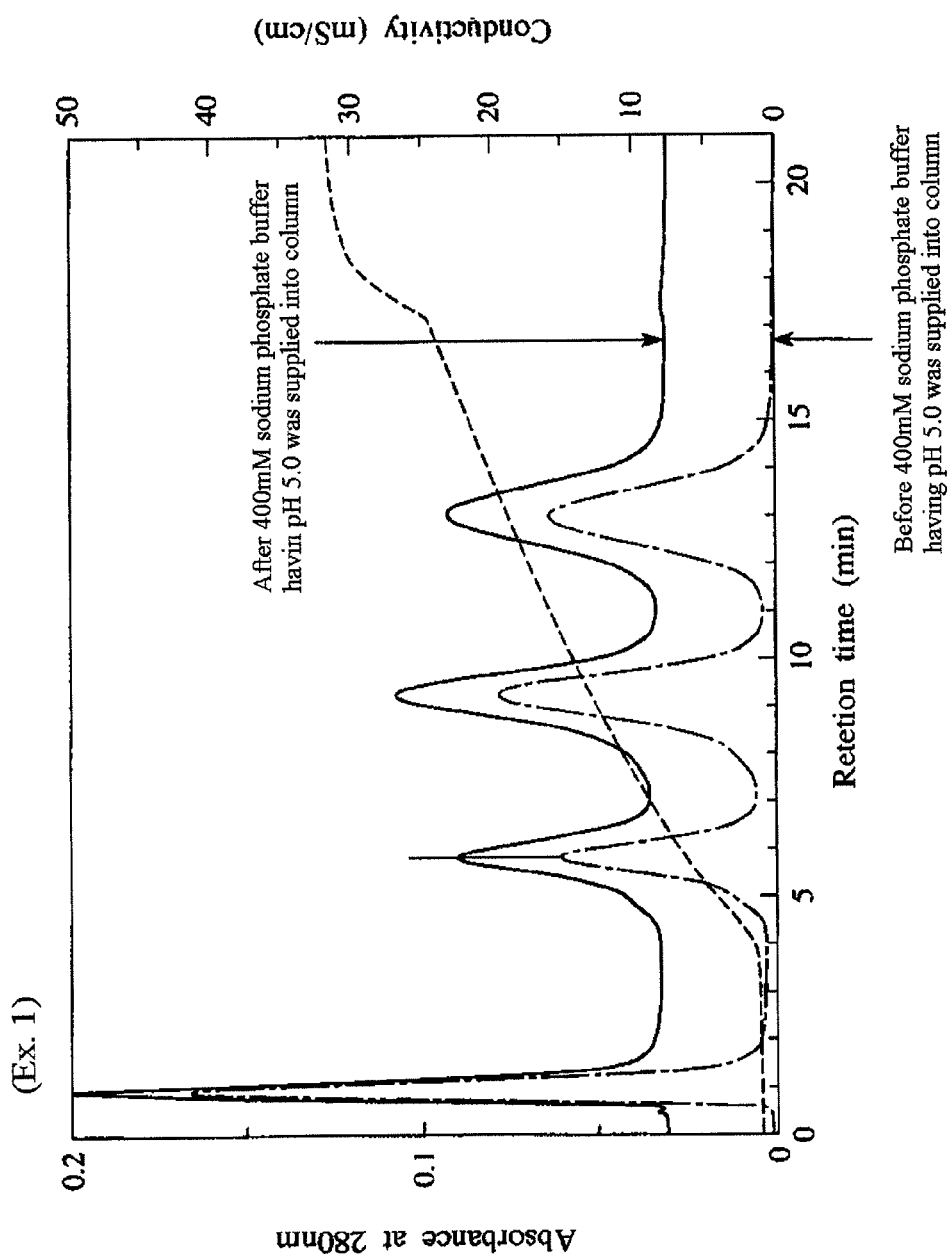
FIG. 2 is a graph which shows a change in protein separation characteristics in a column filled with fluoroapatite sintered particles sintered at a temperature of 400° C. in Example 1.
Figure 3:
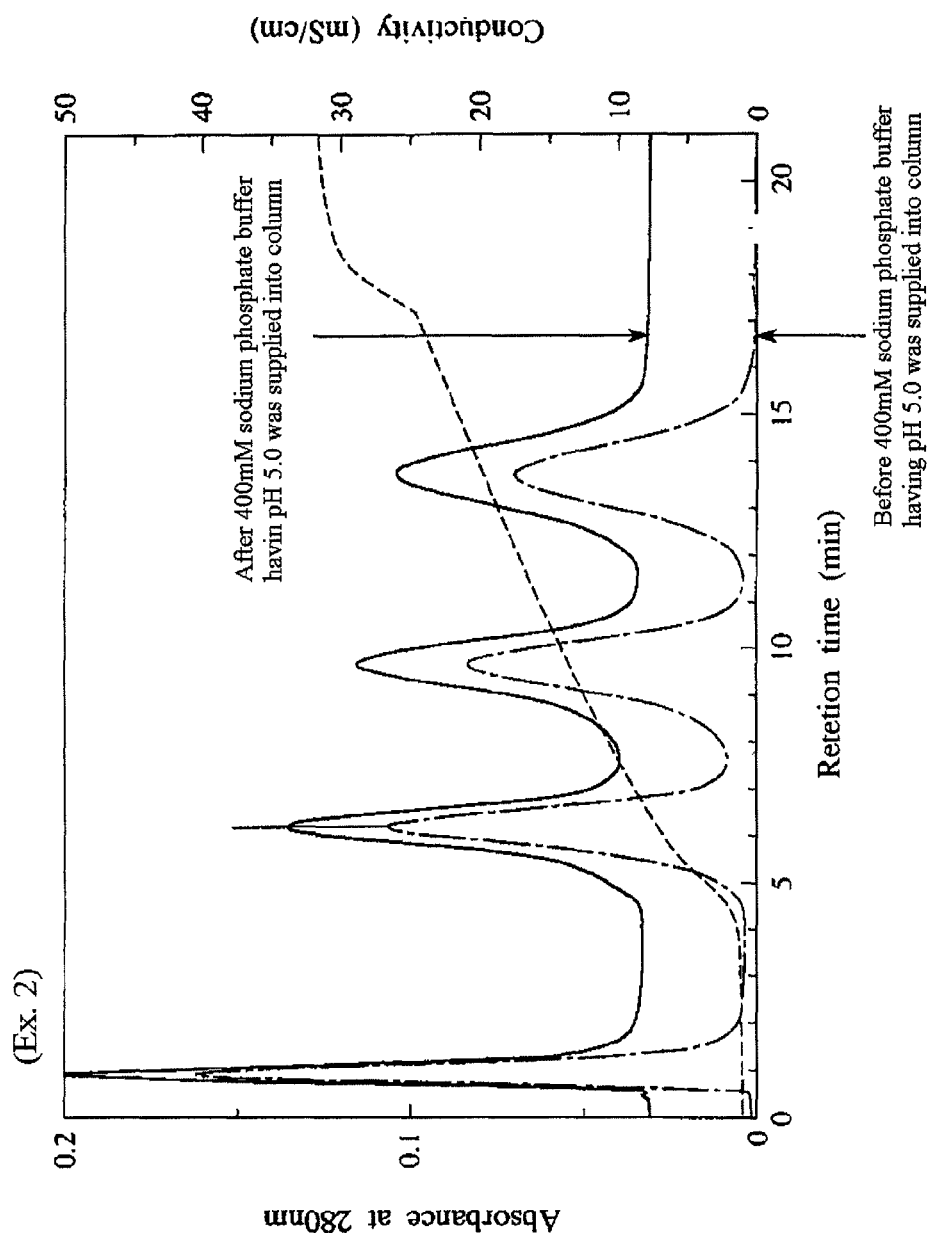
FIG. 3 is a graph which shows a change in protein separation characteristics in a column filled with fluoroapatite sintered particles sintered at a temperature of 400° C. in Example 2.
Figure 4:
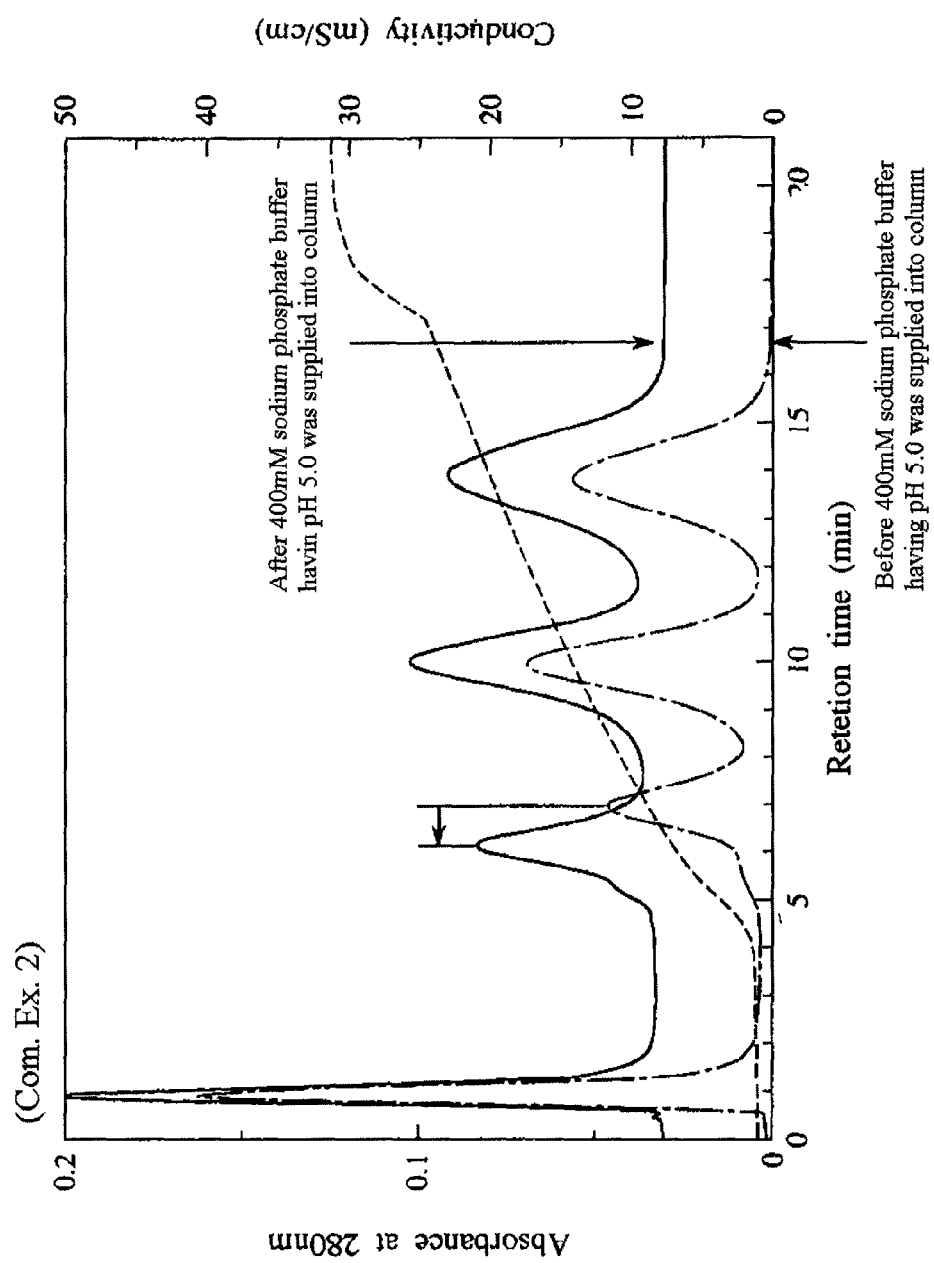
FIG. 4 is a graph which shows a change in protein separation characteristics in a column filled with fluoroapatite sintered particles sintered at a temperature of 400° C. in Comparative Example 2.

It is to be noted that graphs showing a change in the protein separation characteristics in the three columns filled with each of the three kinds of fluoroapatite sintered particles 1 of the Examples 1 and 2 and the Comparative Example 2 respectively are shown in FIGS. 2 to 4 as representatives.

2-4. Evaluation of Effect of pH Change on Solubility of Stainless Steel

A device for use in dropping a hydrogen fluoride-containing solution and a device for use in stirring a slurry are exposed to the hydrogen fluoride-containing solution, and therefore if these devices have low acid resistance, there is a problem that constituent materials of the devices are eluted so that low-purity fluoroapatite primary particles are obtained. Therefore, a test for examining solubility of SUS304 suitable for use as a main material of these devices was carried out. It is to be noted that in order to evaluate the solubility of the SUS304, expensive glass tools need to be used, but a hydrogen fluoride-containing solution corrodes glass tools. For this reason, a nitric acid solution was used instead of the hydrogen fluoride-containing solution because the object of this test can be achieved as long as the solubility of the SUS304 in acid is evaluated.

First, three rings of SUS304 having an inner diameter of 6 mm and an outer diameter of 16 mm were prepared as specimens for a solubility test.

Then, nitric acid solutions of pH 4.0, 3.0, and 2.0 were each prepared in an amount of 25 mL. Then, the three SUS304 rings were immersed in these three nitric acid solutions (each 25 mL) different in pH for 1 hour, respectively. It is to be noted that each of the nitric acid solutions was stirred with a rotator during immersion of the SUS304 ring.

Then, 1 mL of each of the nitric acid solutions (supernatants) different in pH was sampled, and an amount of Fe (iron) eluted in the nitric acid solution was measured by ICP (Inductive Coupled Plasma) equipment (sequential plasma spectrometer) (manufactured by Shimadzu Corporation under the trade name of "ICPS-7500").

Figure 5:
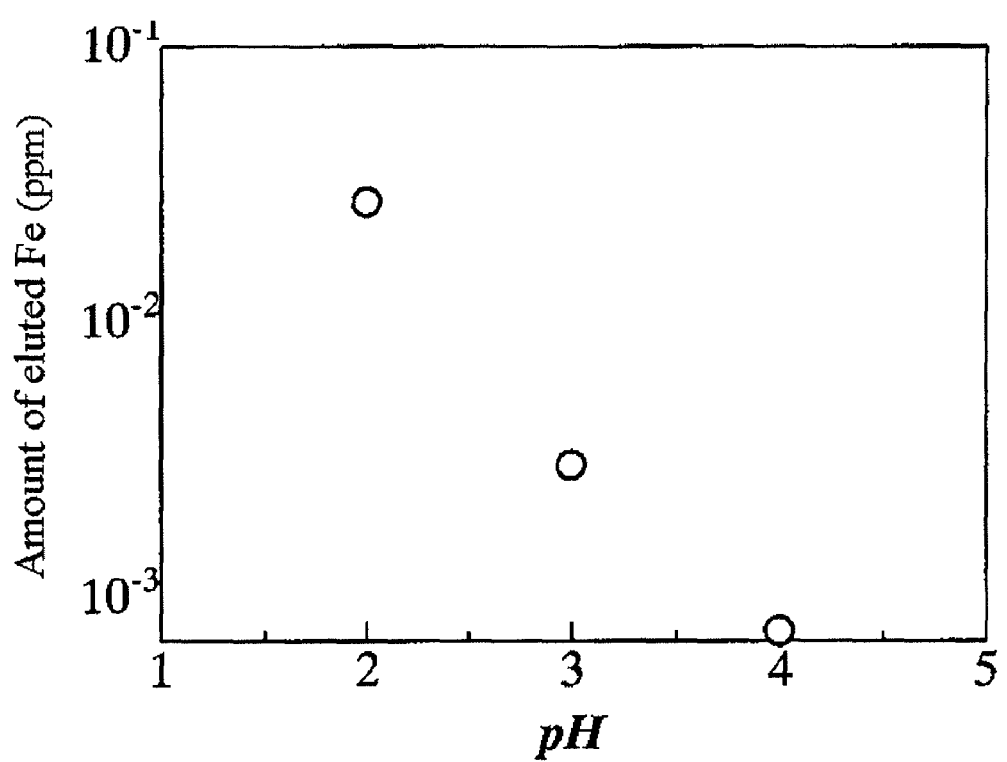
FIG. 5 is a graph which shows a relationship between a pH of a nitric acid solution and an amount of eluted Fe contained in the nitric acid solution.

FIG. 5 is a graph which shows a relationship between the pH of the nitric acid solution and the amount of Fe eluted in each of the nitric acid solutions.

As can be seen from FIG. 5, the amount of Fe eluted in the nitric acid solution exponentially increases as the pH of the nitric acid solution decreases. From the results, it has been found that the pH of the hydrogen fluoride-containing solution to be dropped to the slurry is preferably 2.0 or higher to obtain fluoroapatite primary particles having improved purity.

Further, it is also to be understood that the present disclosure relates to subject matter contained in Japanese Patent Application No. 2007-203553 (filed on Aug. 3, 2007) which is expressly incorporated herein by reference in its entireties.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. A method of producing a fluoroapatite, the method comprising:
   preparing a slurry comprising a hydroxyapatite which has at least one hydroxyl group;
   preparing a hydrogen fluoride-containing solution;
   mixing the hydrogen fluoride-containing solution and the slurry to obtain a mixture with a final pH in the range of 2.5 to 3.96; and
   reacting the hydroxyapatite with the hydrogen fluoride in the mixture in a state that the pH of the mixture is maintained within the range of 2.5 to 3.96 to thereby obtain the fluoroapatite by substituting the at least one hydroxyl group of the hydroxyapatite with fluorine atom of the hydrogen fluoride, wherein no ammonium hydroxide or ammonium salt is added during the method.

2. The method as claimed in claim 1, wherein the mixing the hydrogen fluoride-containing solution with the slurry is carried out by adding the hydrogen fluoride-containing solution into the slurry drop by drop.

3. The method as claimed in claim 2, wherein a rate of dropping the hydrogen fluoride-containing solution into the slurry is in the range of 1 to 20 L/hour.

4. The method as claimed in claim 1, wherein an amount of the hydrogen fluoride contained in the hydrogen fluoride-containing solution is in the range of 1 to 60 wt %.

5. The method as claimed in claim 1, wherein an amount of the hydroxyapatite contained in the slurry is in the range of 1 to 20 wt %.

6. The method as claimed in claim 1, wherein in the mixing the hydrogen fluoride-containing solution is mixed with the slurry so that an amount of the fluorine atom of the hydrogen fluoride becomes in the range of 0.65 to 1.25 times with respect to an amount of the hydroxyl group of the hydroxyapatite.

7. The method as claimed in claim 1, wherein in the reacting the hydroxyapatite is reacted with the hydrogen fluoride contained in the hydrogen fluoride-containing solution at a temperature in the range of 5 to 50° C.

8. The method as claimed in claim 1, wherein in the mixing the hydrogen fluoride-containing solution is added into the slurry for a length of time from 30 minutes to 16 hours.

9. The method as claimed in claim 1, wherein the hydroxyapatite is primary particles synthesized by a wet synthesis method which uses a calcium source and a phosphoric acid source, wherein at least one of the calcium source and the phosphoric acid source is used in the form of a solution.

10. The method as claimed in claim 1, wherein the hydrogen fluoride-containing solution consists essentially of the hydrogen fluoride and water.

11. The method as claimed in claim 1, wherein an amount of the hydrogen fluoride contained in the hydrogen fluoride-containing solution is in the range of 2.5 to 10 wt %.

* * * * *